United States Patent [19]

Bertagna et al.

[11] Patent Number: 4,588,868

[45] Date of Patent: May 13, 1986

[54] HEADSET

[75] Inventors: Richard A. Bertagna, San Dimas; Rudolfo M. Ruiz, Temple City, both of Calif.

[73] Assignee: Avicom International, Inc., Pasadena, Calif.

[21] Appl. No.: 630,028

[22] Filed: Jul. 12, 1984

[51] Int. Cl.[4] .......................... H04M 1/05; H04R 1/10

[52] U.S. Cl. ............................ 179/156 R; 179/182 R; 181/129

[58] Field of Search ........... 179/156 R, 156 A, 182 R, 179/182 A, 178, 179, 180; 381/88; 181/129; 2/209

[56] References Cited

U.S. PATENT DOCUMENTS

| | | | |
|---|---|---|---|
| 3,247,324 | 4/1966 | Cefaly et al. | 381/98 |
| 4,302,635 | 11/1981 | Jacobsen et al. | 179/156 R |
| 4,347,911 | 9/1982 | Bertagna et al. | 181/131 |
| 4,472,607 | 9/1984 | Houng | 179/156 R |
| 4,542,803 | 9/1985 | Houng | 179/156 R |

FOREIGN PATENT DOCUMENTS

| | | | |
|---|---|---|---|
| 0071464 | 2/1983 | European Pat. Off. | 179/156 R |

OTHER PUBLICATIONS

Danavox ad, "Stetomike HMT 808".

*Primary Examiner*—Gene Z. Rubinson
*Assistant Examiner*—Danita R. Byrd
*Attorney, Agent, or Firm*—Christie, Parker & Hale

[57] ABSTRACT

An over-the-head style headset to be used in the airline industry and supplied to passengers in flight to provide audio reception of one or more programs. The headset is designed to be snap-assembled from economically manufactured parts, and is capable of being easily converted between acoustic and electromagnetic operation.

23 Claims, 12 Drawing Figures

HEADSET

BACKGROUND OF THE INVENTION

Passenger entertainment systems are in widespread use in public-transport vehicles such as jet aircraft. These systems include audio equipment for reproducing recorded music or other program material. The audio equipment may also be used in conjunction with visual programs presented on a film screen or television display in the passenger compartment of the vehicle.

To enable selective use of the entertainment system, individual headsets are provided to the passengers for plug-in connection to the audio output of the system. Conventional electromagnetic headsets could be used in this application for the highest quality sound reproduction, but acoustic-style headsets are sometimes preferred for economy, and for simplified cleaning and repackaging enabling re-use of the headset.

An acoustic headset does not include an electromagnetic transducer, and is instead a simple tubing system for conveying sound waves from speakers or similar transducers which are typically located in the passenger's seat. Separate sound tubes enable transmission of two-channel stereo program material, and the tubes terminate in a conventional connector which plugs into a mating receptacle in the passenger's seat.

The type of acoustic headset currently in use in the airline industry includes a generally U-shaped frame which fits under a passenger's chin and supports respective ear pieces mounted on the sound-tube ends. The sound tubes may diverge from a common connection point located approximately centrally of the frame under a listener's chin to connect with the ear pieces, or may be free of mechanical connection to the headset other than at the ear pieces. The ear pieces fit into the central waxy part of a user's ears, and are fitted with protective cushions which can be replaced before re-use of the headset.

A problem with under-the-chin acoustic headsets is that they restrict passenger movement because the ear-piece tips are easily pulled out of the listener's ears. In addition, the location of the frame and sound tubes under a listener's chin causes a general downward pull on the ear-piece tips which can irritate the sensitive part of the ear, and reduce the pleasure a passenger derives from use of the entertainment system.

The present invention overcomes these problems by providing an over-the-head style headset which includes a headband adapted to fit on and over a passenger's head, and rotatably supporting earmuff-style ear pieces. With this arrangement, the headband supports the weight of the headset to eliminate constant downward force on the ear pieces, and a removable protective cushion contacts the outer rim of the user's ear to eliminate irritation of the central part of the ear. A feature of the invention is to provide a multiple-use over-the-head style headset which can be easily assembled by snapping together economically manufactured injection-molded parts, and which can be quickly converted from an acoustic headset to a conventional electromagnetic headset if desired.

SUMMARY OF THE INVENTION

The headset of this invention includes a generally U- or horseshoe-shaped flexible yoke having opposed ends, a pair of support means rotatably mounted on and snap-connected to the respective yoke ends, and a pair of hollow soundconducting rigid bodies or horns snap-connected to and rotatably supported by the respective support means. Each horn extends from a first end through a bent or curved portion to a second end configured to accept snap-connection of an ear guard. A pair of hollow sound-conducting tubes are connected to the first ends of the respective horns, and the opposite ends of the tubes are secured to a plug-in acoustic connector.

Preferably, the horns are press-assembled from pairs of mating half-shells and when assembled define an expanded chamber at their second ends capable of receiving an electromagnetic transducer. A pair of removable protective cushions adapted to fit over the respective ear guard means and rest along the outer rims of a listener's ear are preferably provided to assure comfortable use of the headset.

In a presently preferred form, the pair of support means are rotatable through about 90 degrees on the respective yoke ends whereby the headset of the invention can assume a flattened, folded mode for packaging, repackaging and storage, and an extended or opposed mode for use by a listener. A friction or interference fit is established between the pair of support means and the respective yoke ends, whereby the pair of support means can be moved to various set positions along the lengths of the respective yoke ends to adapt the headset of the invention to different head sizes.

DESCRIPTION OF THE PREFERRED EMBODIMENT

Figure 1:
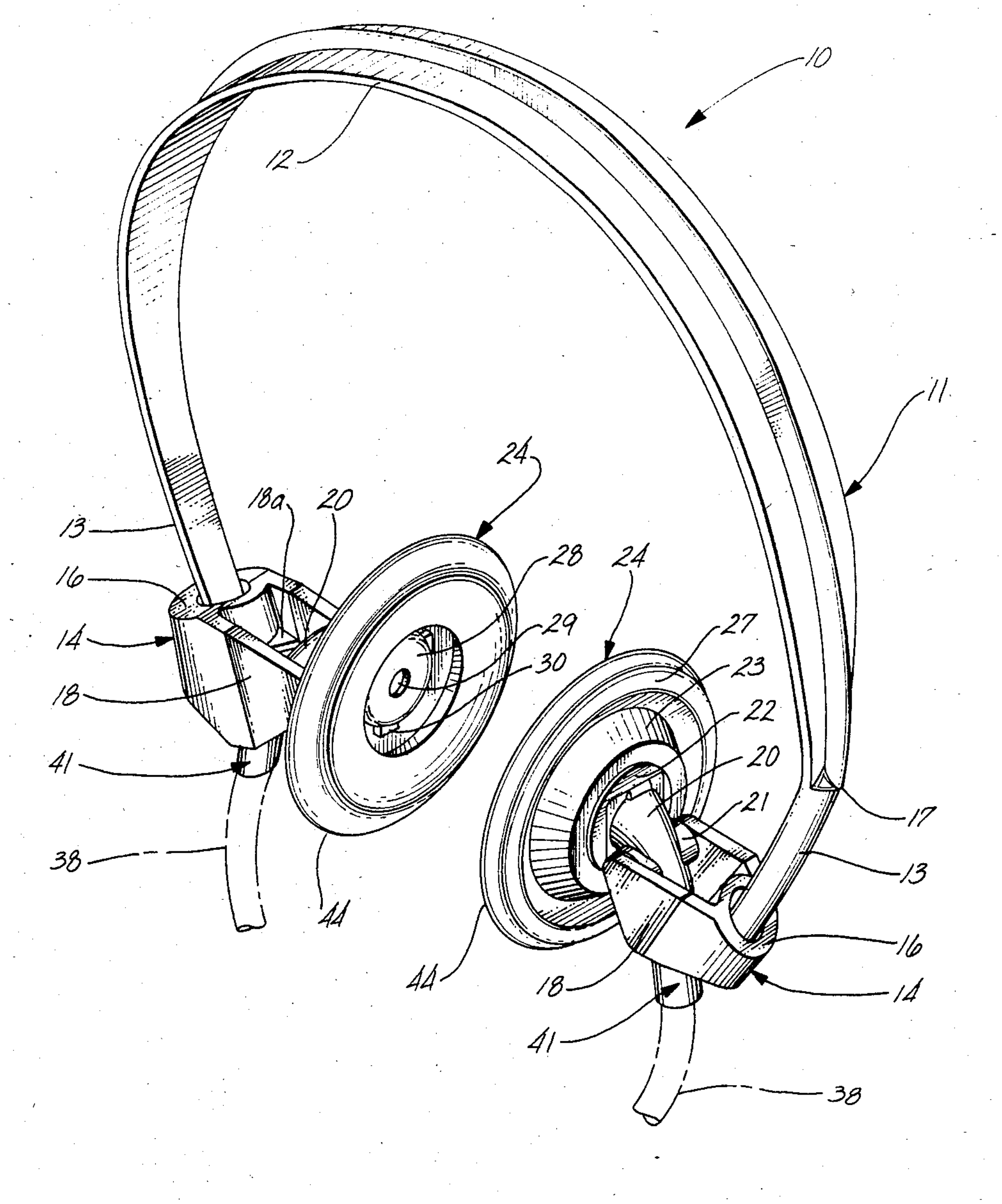
FIG. 1 is a perspective view of a headset according to the invention in the relaxed position.
Figure 2:
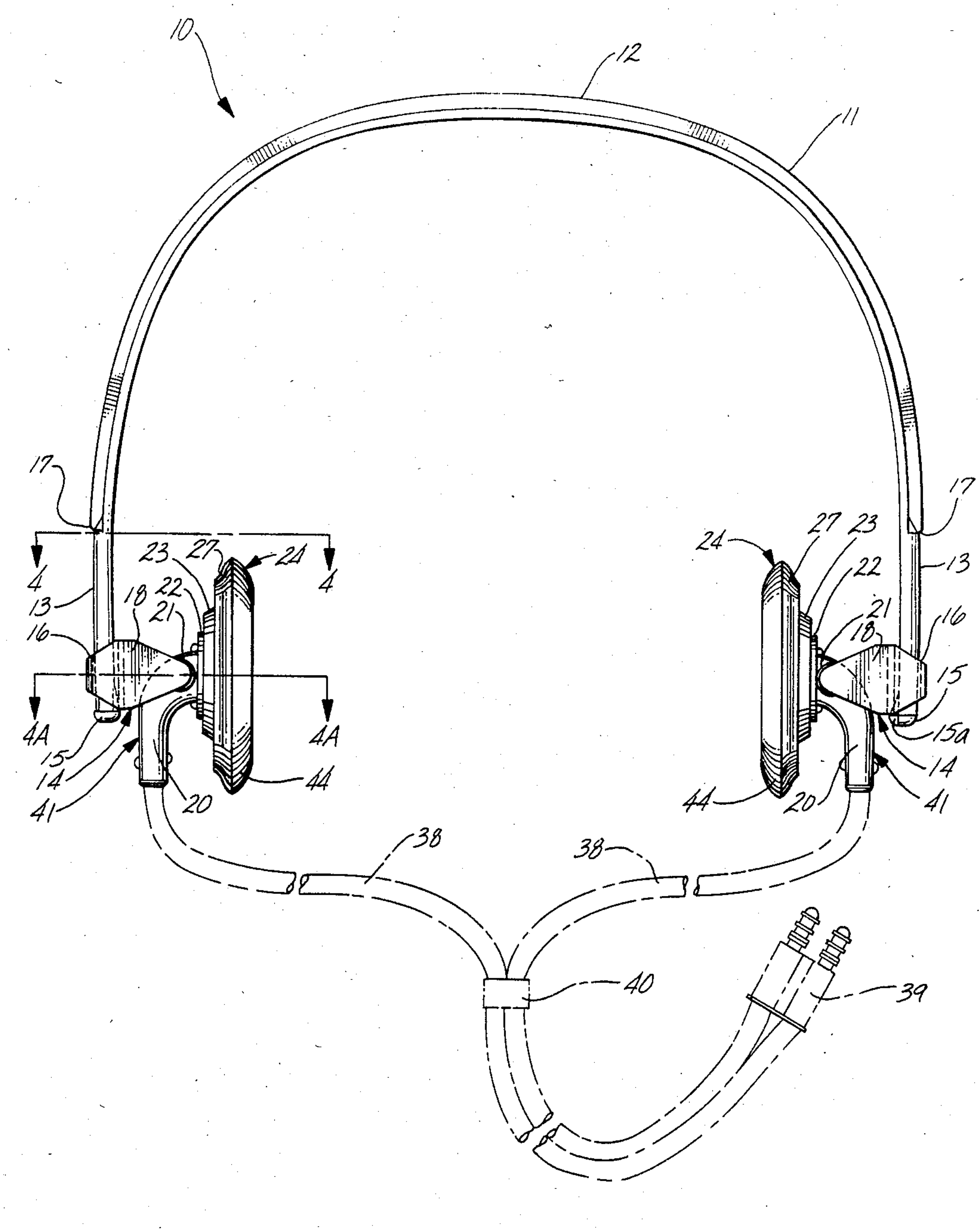
FIG. 2 is a front view of the headset of FIG. 1 in an expanded position as presented when worn by a listener.
Figure 3:
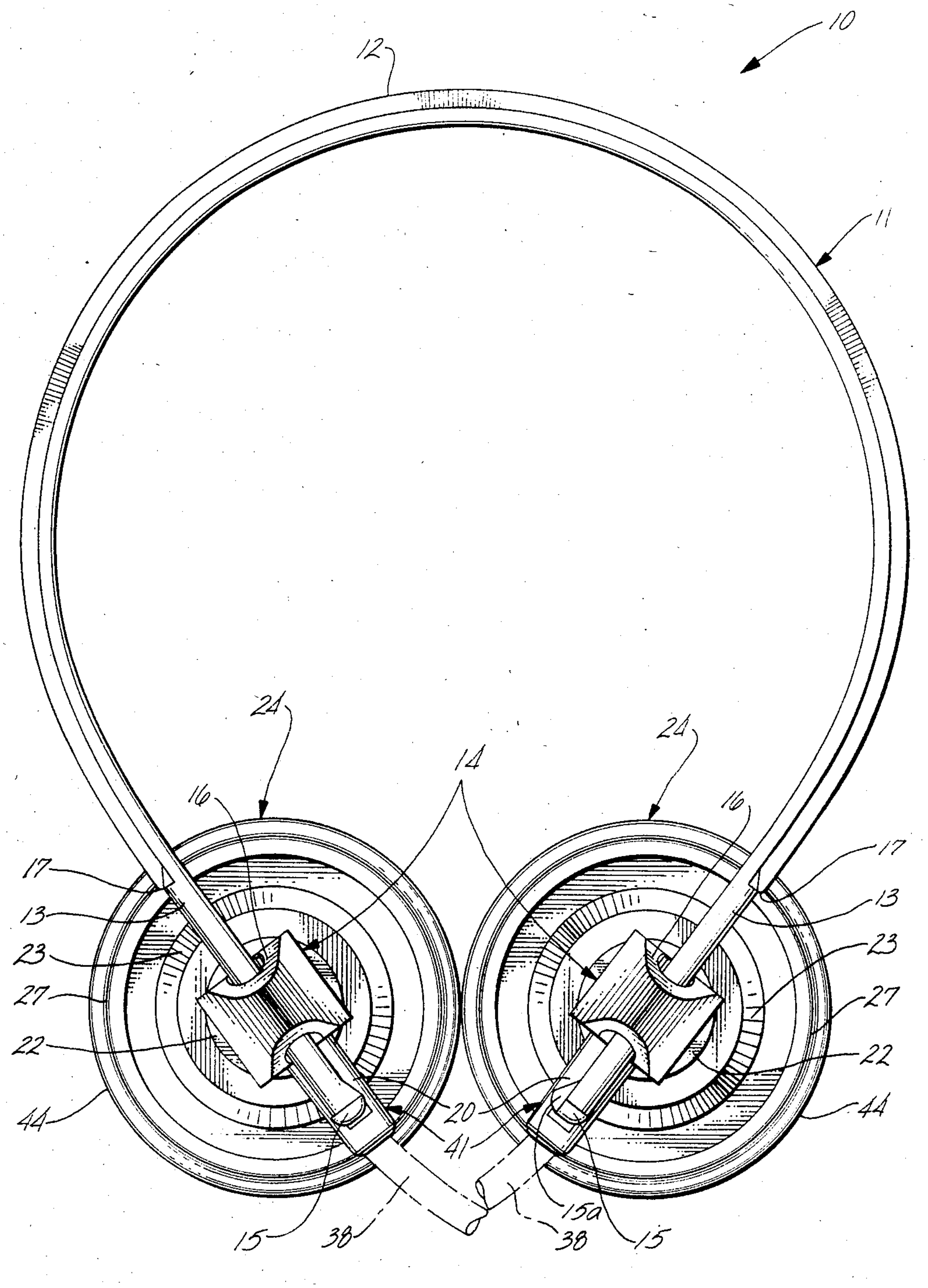
FIG. 3 is a rear view of the headset of FIGS. 1 and 2 in a folded position for packaging.

A headset 10 according to the invention is shown in FIGS. 1–3. The headset 10 includes a yoke 11 and two ear pieces 41 shown in greater detail in FIGS. 4–6D. The yoke 11 is an integrally molded (preferably from a resilient plastic material such as polypropylene) horseshoe-shaped member having a pair of opposed leg portions 13 which are joined at their upper ends by a flexible headband 12. The lower end of each leg portion 13 terminates in a locking piece 15 (FIGS. 2 and 3)

which allows clamps or supports 14 for ear pieces 41 to slide onto the lower ends of leg portions 13, but does not allow them to slide off easily.

These locking pieces are formed of generally hemispherical enlargements slightly larger than the inside diameter of cylindrical portion 16. The plastic material of the yoke has sufficient resiliency to allow the hemispherical enlargements to compress and pass through the cylindrical portion when supports 14 are forced over the ends of the leg portions. Other styles of locking pieces or retainers can be used at the ends of the leg portions while still taking advantage of the snap-together construction feature.

Figure 4:
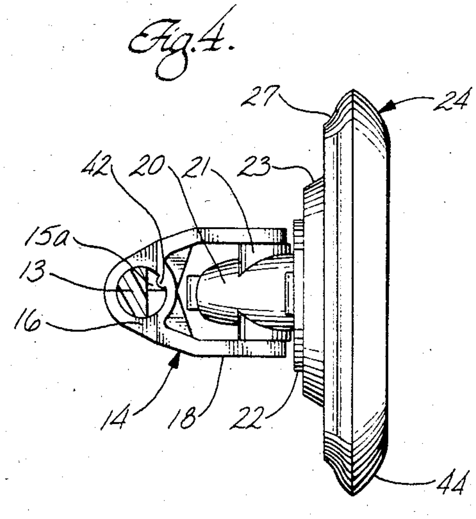
FIG. 4 is a top view, partly in section, of an ear piece and its support on line 4—4 of FIG. 2.

Supports 14, as shown in FIG. 4, are comprised of a hollow generally cylindrical portion 16 capable of encircling one of the leg portions 13, and a pair of arms 18 which extend integrally from opposite sides of cylindrical portion 16 to form a bracket which will rotatably support one of the ear pieces 41. A pair of integrally molded gussets 18A (FIGS. 1 and 4A) preferably extend between the cylindrical portion and the opposed arms to stiffen and strengthen the arms.

The inside diameter of cylindrical portion 16 is just smaller than the outside diameter of leg portion 13 so that a friction or interference fit is established between the two. In this way, supports 14 can be positioned at any point along leg portions 13 between locking pieces 15 and shoulders 17 (FIG. 3) so the headset 10 can be adjusted for different head sizes. For larger heads, supports will be positioned closer to locking pieces 15, and for smaller heads closer to shoulders 17.

Figure 4A:
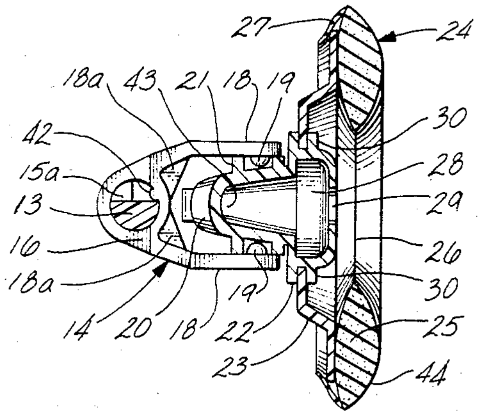
FIG. 4A is a sectional top view of the ear piece and its support on line 4A—4A of FIG. 2 rotated to the folded position.

The hemi-circular cross-sectional configuration of yoke 11 is shown in FIGS. 4 and 4A. This shape strengthens the yoke against breakage in the event the leg portions 13 are flexed toward or away from each other by the user and allows ear pieces 41 to be rotated between a position in which they can be worn by the user (FIG. 2), and a folded position (FIG. 3) in which they will lie flat in the plane of the yoke 11 for easier packaging and storage. To effect a somewhat bistable relationship between these two positions, a wedge-shaped rib or stop 42 (FIGS. 4 and 4A) is provided along the inside surface of cylindrical portion 16 so that ear pieces 41 are constrained to approximately 90 degrees of rotation, and will assume one position when fully rotated in one direction and the other position when fully rotated in the other direction. The hemispherical-enlargement locking piece 15 used at the ends of leg portions 13 is preferably formed with a clearance groove **15*a* to accommodate stop 42** during installation.

The free ends of yoke-like arms 18 each have a knob or pin 19 (FIG. 4A) extending from their facing inner surfaces directly opposite one another. These opposing pins 19 fit loosely into a pair of shallow, hollow cylindrical mounting receptacles 21 extending outward from opposite sides of the outer surface of a hollow sound-conducting horn 20 which is part of the ear piece 41. This allows ear pieces 41 to rotate freely to adapt to the head contours of a listener. The hollow recesses of receptacles 21 are elongated or racetrack-shaped (FIG. 5) to allow additional play in the positioning of the ear pieces. Supports 14 are preferably integrally molded from a resilient plastic material such as polypropylene so that arms 18 can be pulled apart to snap the horns 20 into position.

Figure 5A:
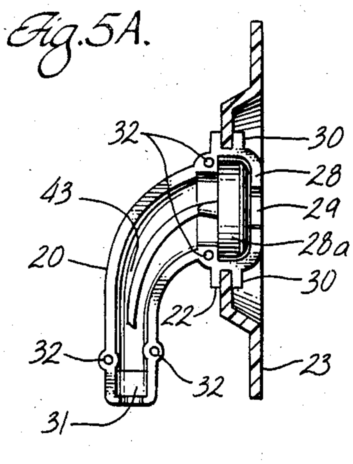
FIG. 5A is a disassembled side view of the horn of FIG. 5.

The horns 20 are hollow to form sound-conducting passages 43 of circular cross-section extending between the ends of horns 20, as shown in FIG. 5A. Preferably, each passage 43 is exponentially tapered to increase in diameter as it extends from a lower or input opening 31 to an upper chamber 28. The exponential taper improves the frequency response of horns 20 and minimizes spurious resonances in the sound-conducting properties of the headset 10 as described in greater detail in U.S. Pat. No. 4,347,911.

The expanded chamber 28 at the upper end of passage 43 is provided to allow rapid conversion between the acoustic headset 10 shown, and an electromagnetic headset if the highest quality sound reproduction is desired. Chamber 28 is configured to be capable of snugly receiving an electromagnetic transducer 28A (FIG. 5A), the wiring for which can extend down passage 43 and out opening 31 to be connected to a source of an audio electrical signal.

The horns 20 are preferably molded as a pair of half-shells from a relatively rigid material such as polystyrene, and the half-shells are then connected together to form a complete horn. To connect the two half-shells, one of the pair is provided with four pins 32 (FIG. 5A) positioned at opposite ends and on opposite sides of passage 43, and extending outward from the rim of the half-shell. The other half-shell of the pair has mating holes 33 positioned to receive pins 32, as shown in phantom line in FIG. 5. The outer diameter of pins 32 is just larger than the inner diameter of holes 33 so that a friction or interference fit is established between them which will hold the two half-shells together.

Figure 5:
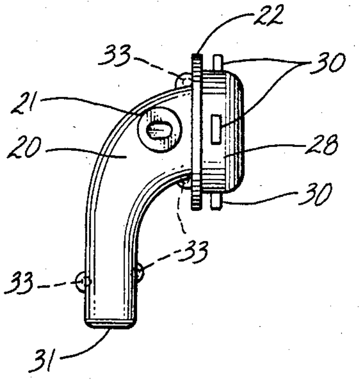
FIG. 5 is a side view of a horn as used in the headset.
Figure 6C:
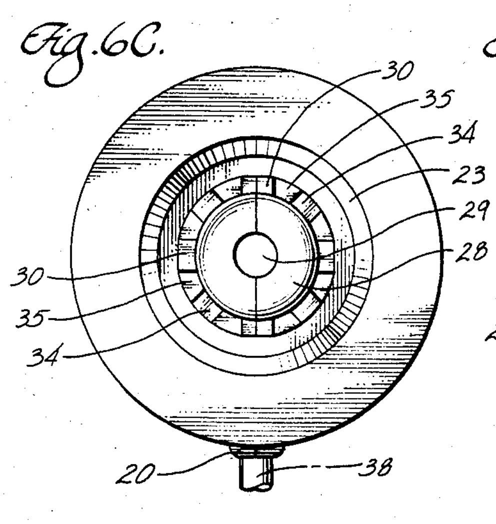
FIG. 6C is a front view of the horn assembled with the ear guard as used in the headset.
Figure 6D:
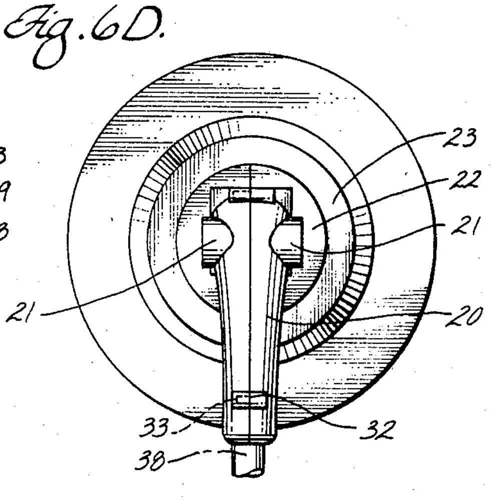
FIG. 6D is a rear view of the horn assembled with the ear guard as used in the headset.
Figure 6:
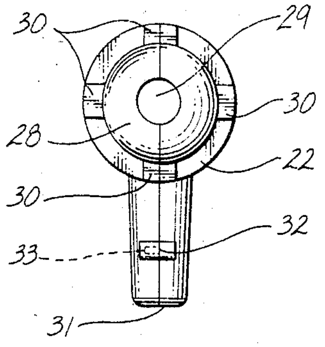
FIG. 6 is an assembled front view of the horn of FIG. 5.

When assembled, each horn 20 has an outwardly extending annular flange or collar 22 at the exterior base of the chamber 28 and four outwardly extending connecting lugs or studs 30 disposed at 90-degree spacing about the exterior, central periphery of the chamber 28, as shown in side and front views in FIGS. 5 and 6, respectively. A dish-shaped ear guard 23 (FIGS. 5A, 6A, and 6B) to block transmission of ambient cabin noise into the listener's ears can then be connected to the upper end of each horn 20.

Figure 6A:
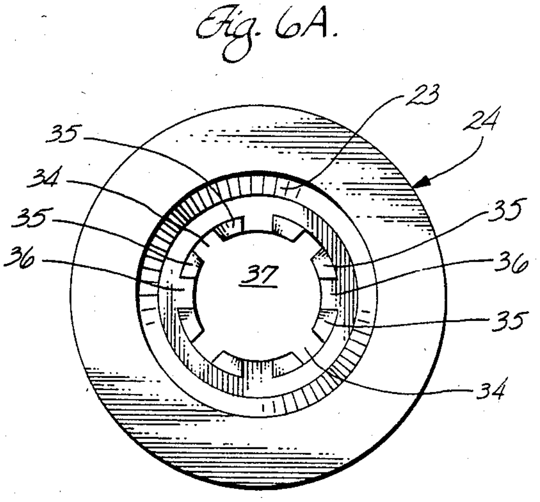
FIG. 6A is a front view of an ear guard as used in the headset.
Figure 6B:
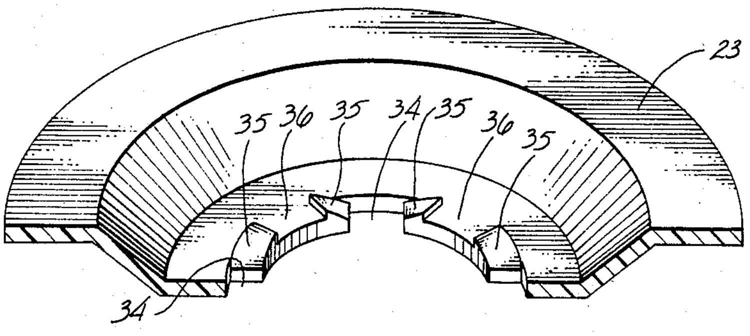
FIG. 6B is a sectional perspective view of the ear guard from above line 6B—6B of FIG. 6A.

Ear guard 23, as shown in FIG. 6A, has a central opening 37 of generally circular cross-section with four radially outwardly extending notches 34 disposed about the periphery at 90-degree spacing. These notches 34 are flanked on either side on the interior face of ear guard 23 by upwardly extending ramps 35, as shown in FIG. 6B. These ramps 35, in turn, form four valley areas 36 disposed at 90-degree spacing about the periphery of central opening 37 on the interior face of ear guard 23.

Central opening 37 is dimensioned so that when the studs 30 on assembled horn 20 are aligned with notches 34, horn 20 can be pushed through central opening 37 until collar 22 contacts the rear face of ear guard 23. To lock ear guard 23 on horn 20, then, horn 20 is rotated through 45 degrees in either direction so that studs 30 ride up their adjoining ramps 35 to snap into and rest in locking fashion in valley areas 36.

To cushion the contact of ear pieces 41 with the listener's ears, an earmuff or protective cushion 24 is provided which will fit over the outer rim of ear guard 23, as shown in FIG. 4A. The cushion 24 is roughly doughnut-shaped and configured to rest along the interior rim of ear guard 23 with a central hole 26 centered over the output opening 29 in horn 20 so that sound can be conducted unimpeded into the ears of the listener.

Cushion 24 is preferably constructed with an external covering 44 of stretchable plastic, such as vinyl, heat sealed at the seams and a filling 25 of soft foam plastic, such as polyester foam. To hold cushion 24 in place on ear guard 23, an annular back skirt 27 is provided which is also preferably constructed of a stretchable plastic, such as vinyl, and is heat sealed to cushion 24 along its outer circumference. The opening in back skirt 27 is dimensioned so that it can be stretched to fit over the rim of ear guard 23.

The headset 10 also includes a pair of sound-conducting plastic tubes 38 which terminate at one end in a conventional acoustic plug or male connector 39 (FIG. 2). The other ends of the tubes 38 are fitted into the lower ends of horns 20. The upper portions of the tubes 38 are not connected to the yoke 11, but are joined approximately 10–15 inches below the attachment to horns 20 by a plastic clip 40. If the headset 10 were converted to an electromagnetic headset as described above, the tubes 38 would be replaced by the wires to the electromagnetic transducer in chamber 28.

In the presently preferred embodiment the plastic tubes are cemented to the lower ends of horns 20, to clip 40 and to connector 39; the sole exceptions to snap-together construction. If complete snap-together construction is desired this can be accomplished with only minor modification to the embodiment depicted.

The headset 10 is intended to be recovered by the operator at the conclusion of the entertainment program. The cushions 24 can be removed and replaced if desired with fresh ones after each use as is the practice with the conventional cushions designed to fit into the central part of the ear, but this should not be necessary because the cushions 24 do not come in contact with the waxy parts of the ear. Any necessary cleaning of the headset 10 can be accomplished at this time, and the unit is then put in its folded position for repackaging in a plastic envelope for another use.

There has been described an improved entertainment system headset 10 which will fit securely and comfortably over and on a listener's head. In addition, the headset 10 is designed so that its components can be economically injection molded and then easily assembled through snap-together connections. If a headset providing the highest quality sound production is desired, headset 10 can be easily converted to an electromagnetic headset.

What is claimed is:

1. An acoustic headset, comprising:
a generally horseshoe-shaped flexible yoke having opposed ends;
retention means at each of the yoke ends;
a pair of support means adapted to be snap-connected to the respective yoke ends by being forced past the retention means and to be rotatably mounted on the respective yoke ends;
connecting means on each of the support means;
a pair of hollow sound-conducting bodies extending from a first end toward a second end and having connecting means adapted to effect a snap-connection with the connecting means on the support means and a rotatable mounting of the bodies on the respective support means;
attachment means at each body's second end;
a pair of ear guard means to rest along the outer rims of a listener's ears and also having attachment means adapted to effect a snap-connection with the attachment means at each body's second end; and
an acoustic connector having a pair of hollow sound-conducting tubes extending therefrom, the tube ends being connected to the respective first ends of the bodies.

2. The headset defined in claim 1 wherein the hollow sound-conducting bodies have inside diameters which enlarge as each body extends from the first end toward the second end while curving through an angle of about 90 degrees.

3. The headset defined in claim 1 wherein the hollow sound-conducting bodies are each press-assembled from a pair of mating half-shells.

4. The headset defined in claim 3, and further comprising an expanded chamber at each of the respective second ends of the bodies adapted to receive a pair of electromagnetic transducers.

5. An electromagnetic headset, comprising:
a generally horseshoe-shaped flexible yoke having opposed ends;
retention means at each of the yoke ends;
a pair of support means adapted to be snap-connected to the respective yoke ends by being forced past the retention means and to be rotatably mounted on the respective yoke ends;
connecting means on each of the support means;
two pairs of mating half-shells having mating fitting means adapted to effect a press-assembly of each pair of mating half-shells to form a pair of hollow bodies extending from a first end to a second end, having an expanded chamber at the second end and having connecting means adapted to effect a snap-connection with the connecting means on the support means and a rotatable mounting of the bodies on the respective support means;
attachment means at each body's second end;
a pair of ear guard means to rest along the outer rims of a listener's ears and also having attachment means adapted to effect a snap-connection with the attachment means at each body's second end;
a pair of electromagnetic transducers adapted to fit inside the respective expanded chambers; and
electrical conducting means able to convey an audio electrical signal to the respective electromagnetic transducers.

6. A headset subassembly, which can be completed to form either an acoustic or an electromagnetic headset, comprising:
a generally horseshoe-shaped flexible yoke having opposed ends;
retention means at each of the yoke ends;
a pair of support means adapted to be snap-connected to the respective yoke ends by being forced past the retention means and to be rotatably mounted on the respective yoke ends;
connecting means on each of the support means;
two pairs of mating half-shells having mating fitting means adapted to effect a press-assembly of each pair of mating half-shells to form a pair of hollow sound-conducting bodies extending from a first end to a second end, having an expanded chamber at the second end and having connecting means adapted to effect a snap-connection with the connecting means on the support means and a rotatable mounting of the bodies on the respective support means;
attachment means at each body's second end; and
a pair of ear guard means to rest along the outer rims of a listener's ears and also having attachment means adapted to effect a snap-connection with the attachment means at each body's second end.

7. The headset subassembly defined in claim 6 completed to form an acoustic headset by further comprising an acoustic connector having a pair of hollow sound-conducting tubes extending therefrom, the tube ends being connected to the respective first ends of the bodies.

8. The headset subassembly defined in claim 6 completed to form an electromagnetic headset by further comprising:

a pair of electromagnetic transducers adapted to fit inside the respective expanded chambers; and electrical conducting means able to convey an audio electrical signal to the respective electromagnetic transducers.

9. The headset subassembly defined in claim 6 wherein each retention means at each of the yoke ends is gradually expanded in diameter extending away from the yoke end until reaching a diameter at which its resiliency will allow the support means to be forced over it and then abruptly is decreased in diameter so that once the support means has been forced onto a yoke end it will not slide off.

10. The headset subassembly defined in claim 6 wherein of the connecting means on each of the support means and the connecting means on each of the bodies, one of the connecting means is a pair of outwardly extending pins and the other is a pair of recesses adapted to rotatably grip the outwardly extending pins on opposite sides of each body.

11. The headset subassembly of claim 6 wherein of the mated fitting means on each pair of mating half-shells, one of the fitting means is a plurality of outwardly extending pins disposed about the periphery of the half-shell and the other is a plurality of recesses correspondingly disposed about the periphery of the mating half-shell, each recess having an inside diameter slightly smaller than the outside diameter of its corresponding pin so that an interference fit is established when the two half-shells are pressed together.

12. The headset subassembly of claim 6 wherein of the attachment means at each body's second end and the attachment means on the ear guard means, one of the attachment means is a plurality of outwardly extending lugs disposed about the periphery positioned above an outwardly extending collar encircling the periphery and the other is a plurality of notches correspondingly disposed about the periphery, a plurality of valley portions correspondingly disposed about the periphery between the notches and a plurality of ramp portions disposed about the periphery between each notch and valley portion, each ramp portion representing a gradual increase in the thickness of the attachment means away from the notch to a thickness just greater than the distance which the lugs are above the collar in the other attachment means and then abruptly decreasing in thickness to the valley portion thickness which is equal to the distance between the lugs and the collar so that the lugs can be fit into the notches and then twisted to ride up the ramp portions; the resiliency of the ramp portion material allowing the lugs to be forced past into the valley portions effecting a snap-together connection.

13. A headset subassembly, which can be completed to form either an acoustic or an electromagnetic headset, comprising:

a generally horseshoe-shaped flexible yoke having opposed ends;

a pair of support means rotatably mounted on and snap-connected to the respective yoke ends;

a pair of hollow sound-conducting bodies snap-connected to and rotatably supported by the respective support means, each body extending from a first end toward a second end, having an expanded chamber at the second end and press-assembled from a pair of mating half-shells; and a pair of ear guard means snap-connected to the respective second ends of the bodies and adapted to rest along the outer rims of a listener's ears.

14. The headset subassembly defined in claim 13 completed to form an acoustic headset by further comprising an acoustic connector having a pair of hollow sound-conducting tubes extending therefrom, the tube ends being connected to the respective first ends of the bodies.

15. The headset subassembly defined in claim 13 completed to form an electromagnetic headset by further comprising:

a pair of electromagnetic transducers adapted to fit inside the respective expanded chambers; and electrical conducting means able to convey an audio electrical signal to the respective electromagnetic transducers.

16. The headset subassembly defined in claim 13 wherein the hollow sound-conducting bodies have inside diameters which enlarge as each body extends from the first end toward the second end while curving through an angle of about 90 degrees.

17. The invention defined in claims 1, 5, 6 or 13, and further comprising a pair of removable protective cushions adapted to fit over the respective ear guard means and rest along the outer rims of a listener's ears.

18. The invention defined in claims 1, 5, 6 or 13 wherein the pair of support means are constrained to rotating through about 90 degrees on the respective yoke ends whereby the invention can be adjusted to rotate between a folded position for packaging, repackaging and storage and a position in which they can be used by a listener.

19. The invention defined in claims 1, 5, 6 or 13 wherein an interference fit is established between the pair of support means and their respective yoke ends whereby the headset can be adjusted to adapt to different head sizes through set positioning of the pair of support means.

20. The invention defined in claims 1, 5 or 6 wherein the retention means at the respective yoke ends are configured to allow the respective support means to be easily snapped on but not to allow the respective support means to be easily snapped off.

21. The headset subassembly defined in claim 13 wherein the respective yoke ends are configured to allow the respective support means to be easily snapped on but not to allow the respective support means to be easily snapped off.

22. The invention defined in claims 1, 5 or 6 wherein the attachment means at each body's second end and the attachment means on each ear guard means are configured to allow each ear guard means to be easily snapped on their respective body's second end but not to allow the respective ear guard means to be easily snapped off.

23. The headset subassembly defined in claim 13 wherein each body's second end and each ear guard means are configured to allow each ear guard means to be easily snapped on their respective body's second end but not to allow the respective ear guard means to be easily snapped off

* * * * *